United States Patent [19]

Midkiff et al.

[11] Patent Number: 4,813,639
[45] Date of Patent: Mar. 21, 1989

[54] CLUSTER MOUNTING SYSTEM FOR SUPPORTING COAXIAL CABLES AND THE LIKE

[75] Inventors: John A. Midkiff, Frankfort; John T. Ash, Lockport, both of Ill.

[73] Assignee: Andrew Corporation, Orland Park, Ill.

[21] Appl. No.: 103,536

[22] Filed: Oct. 1, 1987

[51] Int. Cl.[4] .................................................. F16L 3/22
[52] U.S. Cl. .................................... 248/68.1; 174/148; 174/158 R; 248/230; 248/300
[58] Field of Search ................. 248/68.1, 230, 65, 300, 248/69, 228; 174/163 R, 158 R, 148; 211/107

[56] References Cited

U.S. PATENT DOCUMENTS

| 1,672,720 | 6/1928 | Horsfall | 174/158 R |
| 2,179,406 | 11/1939 | Fitzpatrick | 248/68.1 |
| 2,470,814 | 5/1949 | Hain | 248/68.1 |
| 2,631,809 | 3/1953 | Jacobson | 248/228 X |

FOREIGN PATENT DOCUMENTS

| 788262 | 10/1935 | France | 248/230 |
| 399285 | 10/1933 | United Kingdom | 248/68 R |

OTHER PUBLICATIONS

Microflect Component Catalog, 1986, pp. 6–8.

Primary Examiner—Alvin C. Chin-Shue
Assistant Examiner—David L. Talbott
Attorney, Agent, or Firm—Stephen G. Rudisill

[57] ABSTRACT

A cluster mounting system is provided for supporting a plurality of transmission line or coaxial cable runs in a non-interfering manner on a microwave transmission tower. The system uses a cluster mount member comprising a single strip of metal formed in such a way as to define a plurality of substantially flat mounting surfaces adjoining each other. The mounting surfaces are angularly disposed with respect to adjoining surfaces in such a way that cable carrying hangers may be affixed to each of the surfaces without contacting each other or the cable carried therein. The ends of the cluster mount member are provided with outwardly extending arms through which the cluster mount member and the plurality of hangers and cable supported thereupon may be rigidly mounted directly onto a leg of the transmission tower or a separate support member provided on the tower. Each of the mutually adjacent, angularly disposed mounting surfaces is provided with means adapted to accommodate cable hangers of the clamping type as well as the snap-in type. The cluster mount member permits a plurality of coaxial cable runs to be suspended in a clustered manner without giving rise to significant windloading forces, is easy to install and requires minimum auxiliary installation hardware.

9 Claims, 3 Drawing Sheets

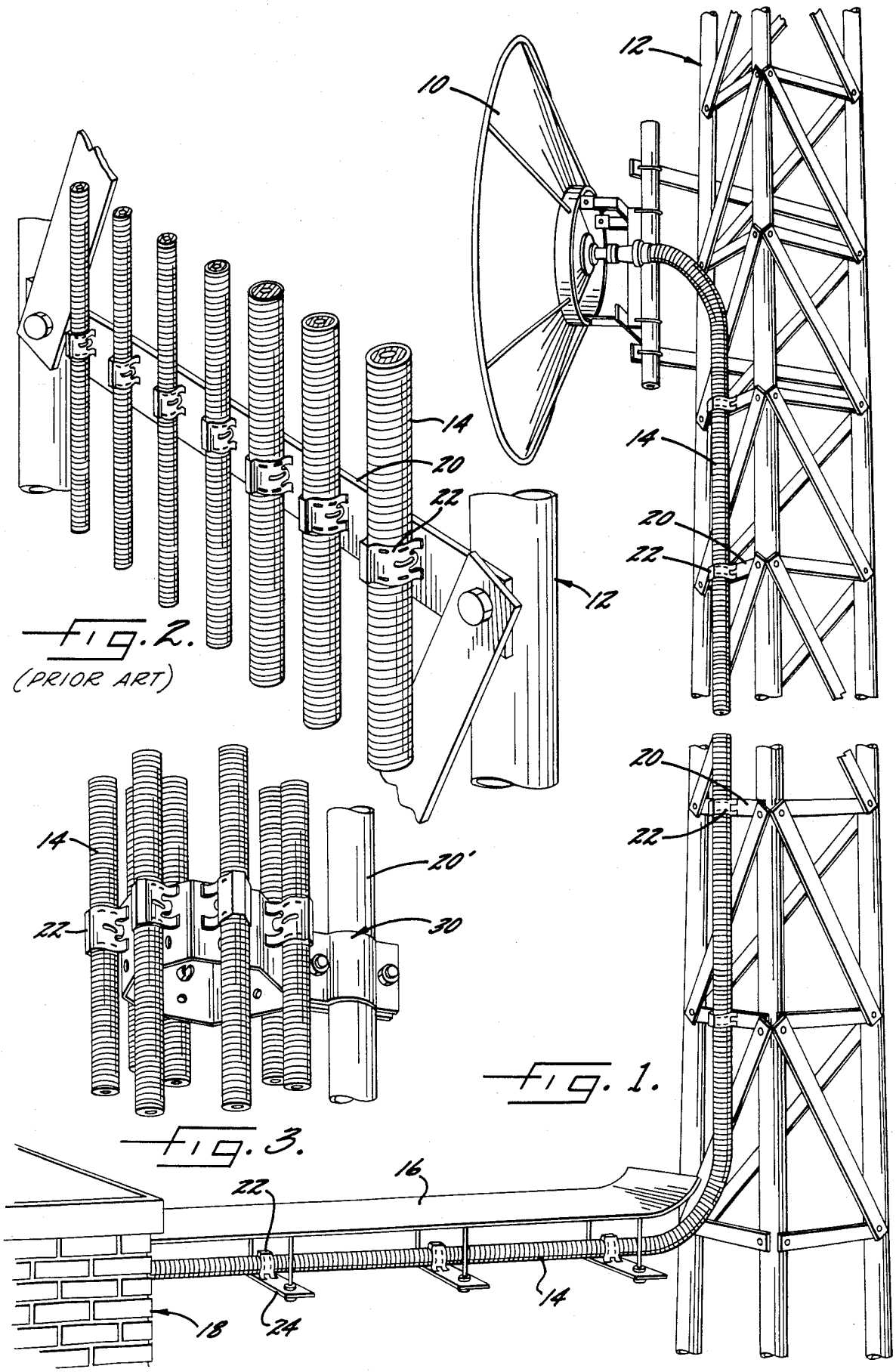

CLUSTER MOUNTING SYSTEM FOR SUPPORTING COAXIAL CABLES AND THE LIKE

FIELD OF THE INVENTION

The present invention relates to devices and arrangements for supporting or mounting transmission lines, such as coaxial cables and the like, on transmission towers for use with microwave antenna systems. More specifically, this invention relates to a novel cluster mount system for suspending a plurality of transmission line runs in a non-interfering, yet closely spaced and rigidly supported fashion.

BACKGROUND OF THE INVENTION

Waveguides or coaxial cables of the circular as well as elliptical kind are commonly used for feeding microwave antennas. The antennas are generally mounted on transmission towers which may extend to heights in the neighborhood of 700–800 feet. In the case of multiple feeding arrangements, a plurality of coaxial cables serving as signal transmission lines are connected to separate antennas supported on a single transmission tower and extend downwardly along the tower. At the base of the tower, the transmission lines generally extend horizontally beneath a covering waveguide bridge to shelters which house the actual transmission and/or reception apparatus. Depending upon the distance between the equipment shelters and the base of the transmission towers, the waveguide bridges themselves may be several feet long.

Under these conditions, it is imperative that each of the transmission lines or coaxial cables be rigidly anchored along its axial run extending from the shelter along the ground to the base of the tower and thereafter upward along the height of the transmission tower. In order to accomplish this, a large number of hangers is required for anchoring each cable at a plurality of positions along its axial run. Conventional arrangements for suspending coaxial cables or transmission lines from transmission towers utilize a plurality of support members disposed along the covering bridge and the transmission tower itself. The support members function as means by which a coaxial cable is anchored at different positions along its length by using some form of hangers. The hangers are generally U-shaped and each hanger is attached to its corresponding support member by a bolt extending through a hole defined in the support member and held in place by a nut and lock washer arrangement.

The process of suspending cables by using such standard hangers is fairly tedious. The hangers have to be first attached to the support members and subsequently the coaxial cable that is to be supported has to be strung along the bridge and up the tower and then clamped down between the arms of each U-shaped hanger by tightening a clamping screw which extends between the arms. The use of such hangers entails considerable installation time due to the two-step procedure involved; in addition, a substantial quantity of auxiliary hardware such as screws, bolts, nuts and washers is needed to adequately anchor the hangers.

An improved hanger which permits faster and easier attachment to a support member and a coaxial cable or waveguide and which does not require auxiliary hardware is described in co-pending U.S. patent application Ser. No. 674,558, filed Nov. 26, 1984. This earlier application is also owned by the assignee of the present application. In that application, a hanger is disclosed which can be simply snapped into an installed position on the support member and, as an incident thereto, automatically clamps the waveguide in such a manner as to securely hold the waveguide or cable without deforming and degrading it. Although the new hanger design has offered some improvement in mounting cables and waveguides on towers, further improvement is needed. For example, when more than one cable or waveguide has had to be mounted on a tower, it has been conventional practice to clamp a plurality of cable, waveguide or other transmission line runs side-by-side up and down one or more faces of the tower. It is apparent, then, that the total number of side runs which can be mounted on any give tower is limited by the widths of the tower faces. Moreover, the more runs that are placed on the faces of a tower, the less space there is available on the faces for other activities, e.g., climbing the tower for antenna installation, maintenance, etc. Additionally, the presence of the runs all around a tower increases windloading with attendant increases in design complexity, construction and maintenance of the tower.

SUMMARY OF THE INVENTION

The present invention addresses the problems described above by means of a cluster mount member. In general terms, the cluster mount member conveniently comprises an elongated band or strip whose ends are brought together and configured to engage a suitable supporting member. In the case of transmission towers, the supporting member may be a conduit, an angle beam or the like attached to a tower, or it may be an integral part of the tower itself. In any case, the cluster mount member extends or projects laterally from the transmission tower to form a hoop-like member. The hoop-like member provides a surface to which a plurality of cables or waveguides may be mounted in a side-by-side relation around the hoop-like member.

Preferably, the hoop-like member has a plurality of flat surfaces around its periphery similar to a polygon. Each cable or waveguide may then be mounted on its own flat surface. Further, each cable or waveguide is preferably mounted in a manner which enables it to be readily and dependably fastened and unfastened. Any one of a number of hangers may be employed for this service. The hanger described in patent application Ser. No. 674,558 referred to above is especially suitable and preferred for this purpose.

In a preferred embodiment the present invention makes use of a cluster mount member essentially comprising a single strip of metal designed in such a way as to define a plurality of substantially flat surfaces adjoining each other. Each of the surfaces is angularly disposed with respect to adjoining surfaces in a manner that allows cable carrying hangers to be affixed to each of the surfaces without contacting each other or the cables carried therein. Each surface of the cluster mount member is provided with means adapted to accommodate both conventional cable hangers of the clamping type and the novel snap-in hangers of the type disclosed in the assignee's co-pending application referenced above. The ends of the cluster mount member are provided with outwardly extending arms through which the member and the plurality of hangers and cables supported thereupon may be rigidly yet conveniently mounted either directly onto the support legs defining the transmission tower on which the cable runs are suspended or onto a separate suspension member, such as a cylindrical pipe, fixed to the transmission tower.

In a specific form of the invention, the mutually adjacent mounting surfaces of the cluster mount member define a substantially octagonal shape with seven faces serving as the cable mount surfaces. The pair of projecting arms through which the cluster mount member may be mounted onto the tower legs are defined about the eighth face of the octagon-shaped mount member. This unique design of the mounting member allows mounting of up to seven separate coaxial cable runs in a compact, clustered and non-interfering arrangement. The cable runs are clamped onto respective surfaces of the mount member with their longitudinal axes extending parallel to the surface and to the tower leg or pipe on which the mount member is fixed. This type of cluster mount arrangement allows a plurality of cable runs to be installed in a relatively small area using minimal hardware and installation time. In addition, the mounting configuration reduces windloading and permits tower faces to remain accessible for antenna installation and maintenance.

BRIEF DESCRIPTION OF THE DRAWINGS

FIG. 1 is a perspective view showing a microwave antenna system with a transmission line suspended from the transmission tower using conventional support bars for affixing cable hangers to the transmission tower.

FIG. 2 is a perspective view showing clearly the conventional side-by-side mounting of cable runs across the width of support bars.

FIG. 3 is a perspective view of the cluster mount arrangement for suspending multiple cable runs using a preferred embodiment of a cluster mount member according to this invention.

DESCRIPTION OF THE PREFERRED EMBODIMENT

Figure 4:
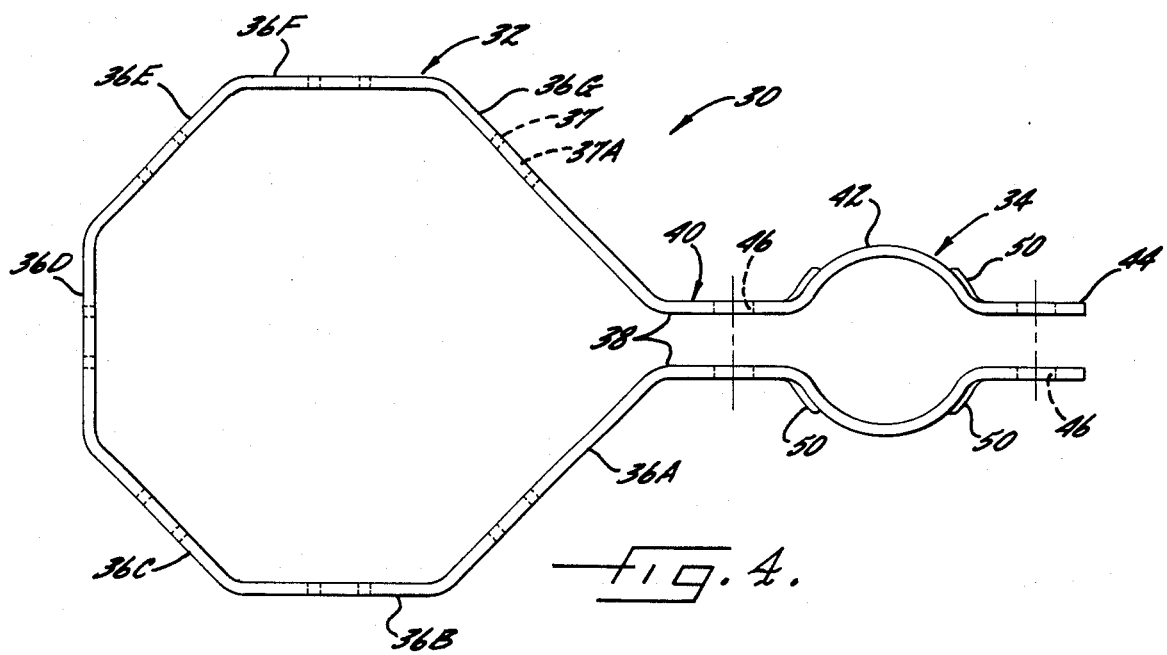
FIGS. 4 and 5 are side and end views, respectively, of the cluster mount member shown in FIG. 3.

While the invention will be described in connection with certain preferred embodiments, it should be understood that the invention is susceptible of various modifications and alternative constructions. It is not intended that the invention be limited to the specific forms disclosed, but, on the contrary, it is intended to cover all modifications, alternative constructions and equivalent arrangements as may be included within the spirit and scope of this invention as defined by the appended claims.

FIG. 1 illustrates a conventional arrangement for suspending transmission lines or coaxial cables in microwave antenna transmission towers by using conventional support members. The antenna system comprises one or more microwave antennas 10 mounted on a transmission tower 12. The tower 12 supports each antenna and its coaxial cable 14 which is connected to the antenna and extends downwardly along the tower. Near the base of the tower, the cable 14 extends horizontally beneath a waveguide bridge 16 which links the tower to an equipment shelter 18 housing the transmission/reception apparatus. Support members or crossbars 20 are provided on the tower 12 at predefined separating distances for attaching the coaxial cable 14 by the use of hangers 22.

The hangers 22 in FIG. 1 are shown to be of a novel type disclosed in the above-referenced patent application. Rectangular, elongate support bars 20 are fairly common, as are hangers of the conventional U-shaped type mentioned earlier which have outwardly extending arms between which the coaxial cable 14 may be clamped by use of a clamping screw.

As mentioned earlier, when more than one coaxial cable run has to be provided on a single tower, it has been conventional in the art to clamp a plurality of cable runs adjacent to each other along the width of the crossbars. Such an arrangement is shown in FIG. 2 wherein a plurality of cable runs 14 are shown to be suspended parallel to each other by the use of hangers 22 disposed along the width of a support bar 20. A significant problem with such conventional arrangements, however, is that the width of the support bars 20 severely limits the number of cable runs that may be accommodated in a non-interfering manner on any given face of the tower 12. Various other disadvantages are also inherent in this conventional arrangement, since the cable runs are all mounted along a single plane in which a support bar 20 lies. Because of the restrictions upon the number of cable runs that can be supported across the width of a given support member 20, it has become necessary to suspend cable runs from a plurality of tower faces by the provision of additional support bars upon those faces. This in turn has restricted the number of tower faces that are accessible for climbing the tower for antenna installation, maintenance or other purposes.

The use of additional support bars also has entailed increased hardware cost as well as added installation time. In addition, because the various cable runs are spread out adjacent to each other along the width of the support bars, the coaxial cables and the transmission tower supporting the cables are subject to increased wind-loading; this consequently results in additional costs for designing and constructing transmission towers capable of withstanding the additional wind-loading factors, as well as increased maintenance costs.

Figure 5:
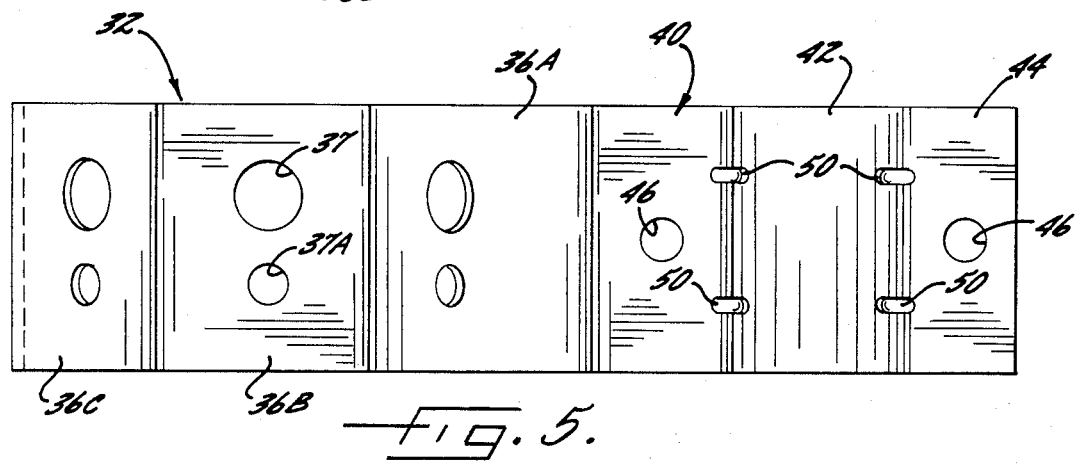

Referring now collectively to FIGS. 3, 4 and 5, there are shown representative drawings of a cluster mount arrangement 30 according to an illustrative embodiment of this invention. The cluster mount member 30 essentially comprises a substantially octagonal cable support section 32 contiguous with a clamp section 34. Preferably, the cluster mount member is integrally formed of a continuous, rectangular strip of metal (such as galvanized steel) with the support section 32 being substantially octagonal-shaped and defining a plurality of substantially flat surfaces 36 adjoining each other. Seven such surfaces 36A, 36B, 36C, 36D, 36E, 36F and 36G are formed so as to define in combination seven sides of an octagon.

Referring in particular to FIG. 4, the cable support area is in the form of an octagon in which one side, the side between sides 36A and 36G, serves as a basis for defining the clamp section. Each of the sides 36A and 36G is extended and linked integrally to horizontal outwardly extending arms 38. The arms 38 define, in combination, a first throat section 40 of the clamp section 34, which in turn is linked integrally to a substantially circular gripping section 42. At the end of the gripping section, a second throat section 44 is defined. The cluster mount member 30 is thus formed of a single strip of metal such that its central section defines the octaqonal cable support area 32, and the horizontal arms extending from the ends of the strip, in combination, define the clamp area 34. The clamp are 34 comprises the circular gripping section 42 interposed between the throat sections 40 and 44.

Each of the flat surfaces 36 in the cable support section 32 is provided with holes for accommodating cable hangers through with cable runs may be anchored to respective surfaces. According to a preferred embodiment of this invention, each face 36 includes two discrete holes 37 and 37A of differing diameters which are capable of accommodating respectively, the snap-in hangers of the type disclosed in U.S. patent application Ser. No. 674,558 referenced above and the standard hangers of the clamping type. The snap-in hangers generally require a relatively larger diameter hole for rigid anchoring as compared to the standard hangers. Typical diameters for the hanger holes 37 and 37A are in the neighborhood of 0.750 inch (for the snap-in hangers) and 0.437 inch (for standard hangers).

Turning now to the clamp section 34, the strip of material from which the cluster mount member is formed to defines two horizontally and outwardly extending arms 38. These arms are transversely spaced in a generally parallel relationship to each other along the first and second throat sections 40 and 44. In between the two throat sections, the arms 38 are curved into a convex-concave shape with the opposing inboard sides being concave and corresponding generally in shape to the curvature of the support member on the transmission tower to which the cluster mount member is to be fixed. The curvature of the extending arms defines a substantially circular gripping section adapted to be mounted directly onto one of the generally cylindrical support legs of the transmission tower or cable support pipes.

In the present instance, since the cluster mount member is made from a strip of resiliently yieldable material, such as stainless steel or low-carbon steel, the octagonal-shaped support section 32 effectively defines a resilient hinge connection between the arms 38. By virtue of this resiliency, the arms can be flexed transversely apart from the relaxed position shown in FIG. 4 so that the second throat section 44 can be opened outwardly so that the circular gripping section 42 may accommodate the tower leg or cable support pipe on which the cluster mount member is to be mounted. Subsequently, the gripping section 42 can be tightly clamped over the tower leg by constricting the two throat sections 40 and 44. This is accomplished by means of mount holes 46 defined through the extending arms 38 within the throat sections and the use of nut and bolt arrangements 48 passing through these holes (see FIG. 6). Stiffening gussets 50 are provided on each of the extending arms 38 at the junctions of curvature in the circular gripping section 42 so as to prevent the curved section of the arms from flexing or bending relative to the flat, planar sections.

Figure 6:
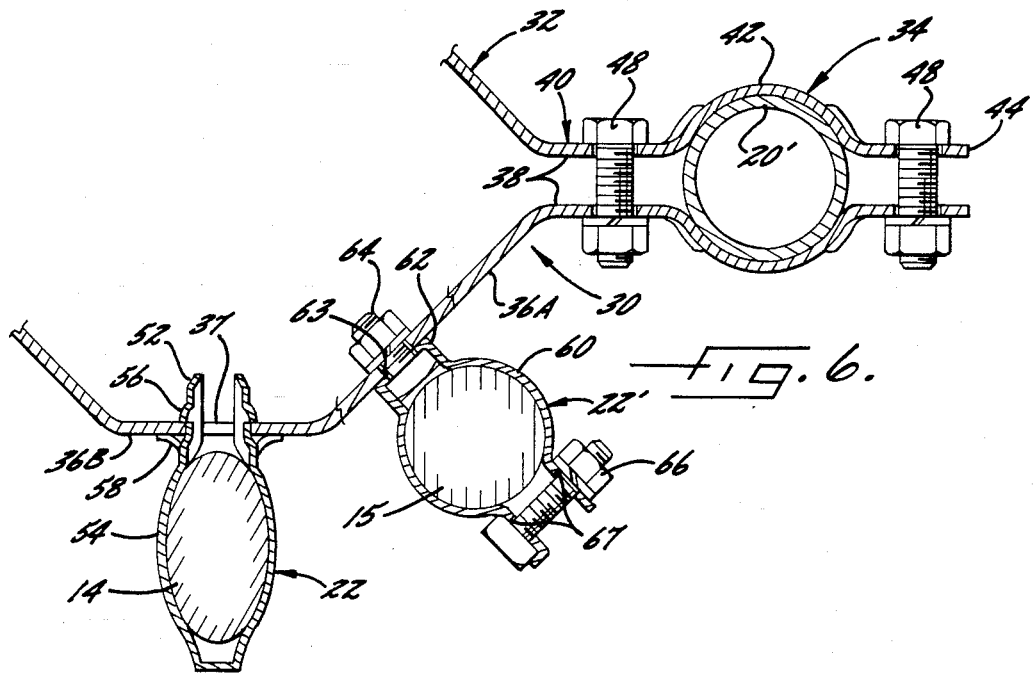
FIG. 6 is a fragmentary top view showing clearly a cluster mount member mounted onto a tubular support member and carrying hangers with coaxial cables supported therein.

Turning now to FIG. 6, there is shown a fragmentary top view illustrating the manner in which hangers and the cables supported therein may be attached to the cluster mount member of this invention. More specifically, FIG. 6 shows a cluster mount member with a hanger 22 of the snap-in type mounted on face 36B and a standard hanger 22, of the conventional clamping type mounted on face 36A. As described in the aforementioned U.S. patent application Ser. No. 674,558, the snap-in hangers 22 are provided with finger-like prongs 52 formed integrally with and projecting inwardly from the inner end portions of legs 54 midway between the upper and lower edges thereof. The prongs 52 are generally semi-circular in radial cross-section and are adapted to be snapped into a circular hole of predetermined diameter formed on a mounting surface. The outer end portions of the prongs are tapered inwardly to facilitate initial insertion of the prongs into the mounting hole. Transversely extending detents 56, each having an inclined outboard surface and an outwardly facing shoulder located outwardly of the inclined surface, are provided on the outboard sides of the prongs 52 so as to resist the removal of the prongs from the mounting hole once the prongs have been inserted therein. Transversely extending feet 58 are provided on the hanger 22 for engaging the outer side of a mounting surface to resist lateral movement of the hanger after installation.

The diameter of the hole 37 provided on each of the mounting surfaces 36 of the cluster mount member is selected to be such as to conveniently allow the prongs 52 to be snapped into position after being manually squeezed together. In addition, the radial dimension of each hole 37 is selected to correspond substantially to the curve on the semi-circular outboard side of each prong 52.

In using such snap-in hangers with the illustrative cluster mount member, a hanger 22 is first horizontally and inwardly moved toward the waveguide 14 which is to be supported. For the elliptical waveguide shown in FIG. 6, this movement is in a direction extending parallel to the major axis of the waveguide. As the prongs 52 start engaging the waveguide 14, the prongs and the legs 54 are flexed apart so that the prongs move past the waveguide by slipping over the minor axis diameter of the waveguide and eventually spring back to their normal, relaxed position. At this point, when the legs are in full straddling relationship with the waveguide 14, the legs 54 of the waveguide are manually squeezed together so that the prongs 52 are closed to an effective diameter approximating the diameter of the hole 37 thereby allowing insertion or snapping of the prongs and detents 56 defined thereupon into the hole. After the detents clear the inner side of the surface (36B in FIG. 6), the squeezing pressure on the legs 54 is released so that the inherent resiliency of the hanger material spreads the prongs until the arcuate outboard surfaces of the prongs forcibly engage the circular edge of the hole 37.

As is evident from this description, fixing a waveguide to any of the surfaces of the cluster mount member merely involves positioning the hanger around the waveguide and then snapping it into position within the mounting hole 37 for a selected mounting surface. It will be understood that snap-in hangers designed for use with coaxial cables (as opposed to elliptical waveguides) can also be accommodated in a similar manner by the illustrative cluster mount member, as long as the hangers are provided with the transversely flexible legs with the retaining prongs and detents defined thereupon.

FIG. 6 also shows the manner in which a standard hanger 22, of the clamping type may be mounted onto a surface 36A of the mount member. A hanger of this type essentially comprises a generally U-shaped clamp having arcuate legs 60 defining a substantially flat bridge section 62 which includes a hole 63 through which the clamp may be mounted onto a mounting surface through use of a nut and bolt arrangement 64. The open ends of the legs 60 are adapted to be held together in a squeezed position once the arcuate section of the hanger is positioned around a waveguide 15. For this purpose, the open ends of the legs 60 are provided with holes through which a nut and bolt arrangement 66 may act in clamping the legs over the waveguide 15.

Each of the mounting surfaces 36 of the cluster mount member of this invention is provided with a hole 37A having a diameter capable of accommodating the screw used for clamping the hanger onto the mounting surface. As will be apparent, the diameter of the hole 37A will generally be substantially smaller than that of hole 38. In using such standard hangers, the hanger 22' has to be first clamped onto the mounting surface 36A by using the nut and bolt arrangement 64 in conjunction with the mounting hole 37A. Subsequently, the waveguide 15 is positioned in between the U-shaped area of the hanger and the legs 60 tightened over the cable by using a nut and bolt arrangement 66 in conjunction with holes 67 provided on the extending legs.

Because the mounting holes 37 and 37A are provided on each of the mounting surfaces 36, a run of coaxial cable can be affixed to any given mounting surface by using either of the two types of hangers. Regardless of the type of hanger being used, the substantially octagonal shape of the cable support section insures that hangers mounted onto adjacent surfaces and the cables supported therein do not interfere with each other. Accordingly, by making use of all the mounting surfaces defined on the cluster mount member, up to seven runs of coaxial cable or elliptical waveguide may be securely and non-interferingly supported by using a single mount member.

Figure 7:
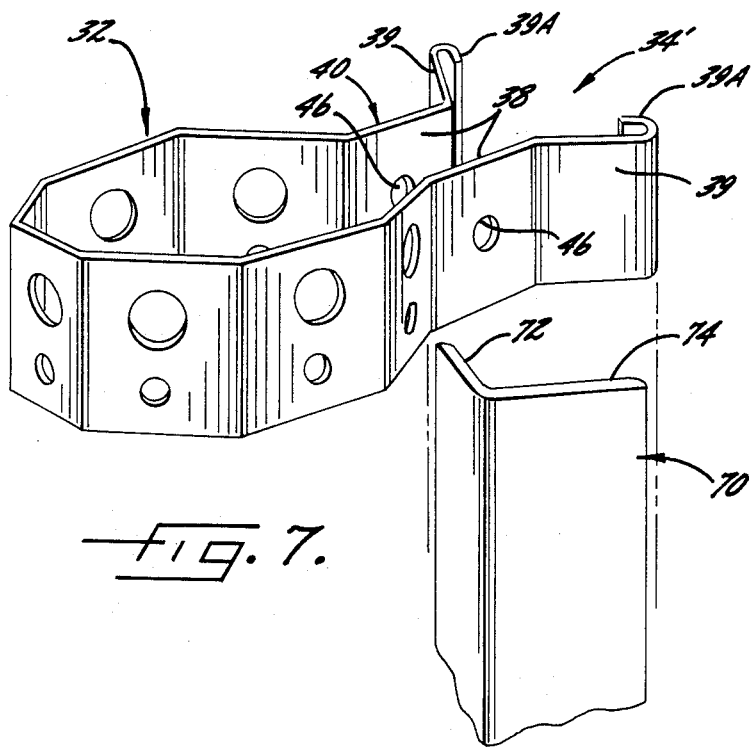
FIG. 7 is a perspective view of an alternate embodiment of the cluster mount member of this invention which is capable of being clamped onto angular support members.

The clamp section of the cluster mount member, as shown and discussed above with respect to FIGS. 3–6, is specifically adapted for convenient use with cylindrical tower legs which are most commonly used in transmission towers. However, the clamp section may also be designed for use with tower legs or support members with differing physical configurations. For instance, FIG. 7 shows an alternate embodiment of the cluster mount member of this invention in which the clamping section 34 is adapted for use with a tower leg or supporting member in the form of a conventional angle beam 70. The beam essentially comprises a pair of integrally formed planar surfaces 72 and 74 disposed at a predetermined angle relative to each other.

A cluster mount member for use with such an angle beam comprises a cable support section 32 which is identical to that of the preferred embodiment of FIGS. 3–6. The clamp section 34', however, includes a single throat section 40 having mounting holes 46 defined therethrough and a contiguous gripping section defined by bending each of the extending legs 38 at a predetermined angle that corresponds substantially to the angular disposition of the planar surfaces 72, 74 of the angle beam 70. The angularly extending sections 39 have their outer ends bent inwardly to form U-sections 39A which are adapted to hook over and slide along the edges of the angularly disposed planar surfaces. Accordingly, the cluster mount member can be mounted onto a desired position along the length of the angle beam by positioning the angular sections 39 against the outer surfaces of the angular beam and manually flexing the arms 38 of the mount member slightly apart until the U-sections 39A hook over the edges of the planar surfaces 72, 74 and come into frictional contact with the inner surfaces thereof. Subsequently, the throat section 40 can be tightened by using a nut and bolt arrangement positioned through the mounting hole 46 so that the angular sections 39 of the arms 38 are forced towards each other against the planar surfaces of the angle beam. Because of the frictional engagement between the U-sections 39A with the edges and the inner sides of the planar surfaces, the clamping action provided by the single throat section 40 is sufficient to rigidly anchor the cluster mount member about the angle beam.

From the foregoing, it is apparent that the cluster mounting arrangement of this invention provides a simple and convenient means for suspending a plurality of coaxial cable lines or the like on microwave transmission towers in a non-interfering manner. The cluster mount member described above is adapted to rigidly support cable runs using cable hangers of the conventional clamping type as well as the novel snap-in type. The cluster mount member is also adapted to be mounted directly onto transmission tower legs or onto separate support members provided on the transmission towers. By supporting a plurality of coaxial cable runs in a clustered fashion about angularly disposed adjoining surfaces, the cluster mount member avoids the problems associated with increased windloading forces. In addition, the cluster mount member as disclosed herein is inexpensive to manufacture, easy to install and remove, and requires relatively little auxiliary installation hardware.

What is claimed is:

1. A cluster mount member for supporting a plurality of cable hangers of both the clamping type and the snap-in type, each hanger being adapted to carry a length of cable, said member adapted to be affixed rigidly to a support member and comprising a single elongated metallic strip having first and second ends, said strip integrally defining
    (a) a polygon-shaped cable support section disposed between said ends and shaped to define an array of substantially flat contiguous surfaces, each of said surfaces configured to engage a cable hanger in a fixed relation and being angularly disposed with respect to adjoining ones of said surfaces in such a way that a cable carrying hanger may be affixed to each of the surfaces without any interfering contact between said hangers, said cables carried therein, and said support member, and
    (b) a clamping section wherein said first and second ends of said metallic strip define outwardly extending arms which in combination, are adapted to be clamped directly about the support member without need for secondary support members so that the cluster mount member and said hangers and cables disposed thereupon may be rigidly affixed to said support member.

2. The cluster mount member as set forth in claim 1 wherein said cable support section defining the angularly disposed flat surfaces is substantially octagon-shaped.

3. The cluster mount member of claim 1 wherein said outwardly extending arms in said clamping section, in combination, define a gripping section adapted to be positioned around said support member in a substantially enclosing manner, and at least one throat section adapted to exert a controllable constricting force on said gripping section so as to rigidly clamp said gripping section and said cluster mount member onto said support member.

4. The cluster mount member of claim 3 wherein said support member is cylindrical and said outwardly extending arms define a gripping section which is substantially circular and has an inner diameter conforming substantially to the outer diameter of the cylindrical support member.

5. The cluster mount member of claim 4 wherein said outwardly extending arms in said clamping section define a pair of throat sections contiguous with and disposed on either side of said circular gripping sections for exerting said constricting force thereupon.

6. The cluster mount member of claim 5 wherein each of said flat surfaces in the cable support section defines at least one mounting hole capable of accommodating a cable hanger having a pair of transversely spaced legs adapted to be inserted through and retained within said mounting hole.

7. The cluster mount member of claim 6 wherein each said throat section includes at least one clamp hole defined by each of said outwardly extending arms, each pair of holes in each said throat section adapted to accommodate a nut and bolt arrangement for exerting a constricting force on said gripping section.

8. The cluster mount member of claim 3 wherein said support member is in the form of an angle beam having a pair of contiguous planar surfaces angularly disposed relative to each other, and said arms in said gripping section define a pair of angular sections conforming substantially to the angular disposition of said planar surfaces, said angular sections including means for restraining said sections in adjacent relationship with said planar surfaces.

9. Apparatus for rigidly supporting a plurality of cables, waveguide or like transmission members from a support member on a transmission tower by means of cable hangers of both the clamping and snap-in type, said apparatus comprising:

a hoop-like member terminating in two integral end portions which project away form the hoop-like member in generally parallel fashion, said end portions configured to releasable engage, in combination, said support member, without need for secondary support members, in such a way that the hoop-like member extends laterally from the tower in a stable manner;

said hoop-like member having defined along its periphery a plurality of surfaces each adapted to fixedly engage a cable hanger of the clamping or snap-in type whereby a plurality of transmission members may be supported at each of said surface around the periphery in a spaced relation and generally parallel to each other and to the tower without any interfering contact between said hangers, said transmission members supported thereby, and said support member; and a separate cable hanger attached to the hoop-like member at each of said plurality of surfaces actuatable to inter-engage a separate one of said transmission members to the hoop-like member.

* * * * *